(12) United States Patent
Menzel

(10) Patent No.: US 8,568,676 B2
(45) Date of Patent: *Oct. 29, 2013

(54) PROCESS FOR WORKUP OF A CARBON DIOXIDE-RICH GAS TO BE FREED OF SULFUR COMPONENTS

(75) Inventor: Johannes Menzel, Waltrop (DE)

(73) Assignee: Thyssenkrupp Uhde GmbH, Dortmund (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/638,428

(22) PCT Filed: Mar. 22, 2011

(86) PCT No.: PCT/EP2011/001397
§ 371 (c)(1),
(2), (4) Date: Sep. 28, 2012

(87) PCT Pub. No.: WO2011/120647
PCT Pub. Date: Oct. 6, 2011

(65) Prior Publication Data
US 2013/0022534 A1  Jan. 24, 2013

(30) Foreign Application Priority Data

Mar. 29, 2010 (DE) .................... 10 2010 013 279

(51) Int. Cl.
*B01D 53/52* (2006.01)
*B01D 53/62* (2006.01)
*C10L 3/10* (2006.01)

(52) U.S. Cl.
USPC ..... 423/220; 423/228; 423/242.1; 423/242.7; 423/573.1; 423/574.1; 95/235; 95/236; 48/127.3; 48/127.5; 48/127.7

(58) Field of Classification Search
USPC ............... 423/220, 228, 242.1, 242.7, 573.1, 423/574.1; 95/235, 236; 48/127.3, 127.5, 48/127.7
See application file for complete search history.

(56) References Cited

U.S. PATENT DOCUMENTS

| 2006/0067875 A1 | 3/2006 | Koss et al. |
| 2011/0023714 A1 | 2/2011 | Weiss et al. |
| 2013/0017144 A1 * | 1/2013 | Menzel ..................... 423/542 |

FOREIGN PATENT DOCUMENTS

| EP | 0331228 | 9/1989 |
| EP | 0455285 | 11/1991 |
| EP | 0520316 | 12/1992 |
| WO | WO 97/03920 A1 * | 2/1997 |
| WO | 2009068049 | 6/2009 |

OTHER PUBLICATIONS

International Search Report for PCT/EP2011/001397, English translation attached to original, Both completed by the European Patent Office on Jun. 27, 2011, All together 7 pages.

* cited by examiner

*Primary Examiner* — Timothy Vanoy
(74) *Attorney, Agent, or Firm* — Brooks Kushman P.C.

(57) ABSTRACT

A process for workup of an industrial carbon dioxide-rich gas to be freed of sulfur components, in which an industrial gas to be freed of sulfur components is purified by a gas scrubbing, and the laden solvent is freed of carbon dioxide and hydrogen sulfide by a regeneration to obtain at least one acid gas fraction having a relatively high content of sulfur components, and the fraction with the highest hydrogen sulfide ($H_2S$) content is supplied to a Claus plant with downstream Claus process gas hydrogenation, and at least one carbon dioxide-laden, low-hydrogen sulfide acid gas fraction from the regeneration device, which has a reduced sulfur content compared to the fraction with the highest hydrogen sulfide ($H_2S$) content, is combined with the hydrogenated Claus process gas to give a combined process gas stream, which is supplied to further processing or to recycling into the process.

8 Claims, 2 Drawing Sheets

PROCESS FOR WORKUP OF A CARBON DIOXIDE-RICH GAS TO BE FREED OF SULFUR COMPONENTS

CROSS-REFERENCE TO RELATED APPLICATION

This application is the U.S. national phase of PCT Appln. No. PCT/EP2011/001397 filed on Mar. 22, 2011, which claims priority to German Patent Application No. 10 2010 013 279.9 filed on Mar. 29, 2010, the disclosures of which are incorporated in their entirety by reference herein.

The invention relates to a method for the processing of an industrial, carbon dioxide-rich gas to be freed from sulphur constituents, according to which an industrial gas to be freed from sulphur constituents is treated in a gas scrubbing section and the laden solvent is freed from carbon dioxide and hydrogen sulphide by regeneration, with at least one acid gas fraction of a higher content of sulphur constituents being obtained and the fraction of the highest content of hydrogen sulphide ($H_2S$) being fed to a Claus plant including subsequent Claus process gas hydrogenation, and at least one carbon dioxide-laden, hydrogen sulphide-depleted acid gas fraction from the regeneration unit, which has a lower content of sulphur than the fraction of the highest content of hydrogen sulphide ($H_2S$), being merged with the hydrogenated Claus process gas to form a joint process gas stream which is passed to further process steps or recycled to the process.

Many industrial gases, such as natural gas, synthesis gas, refinery gases or coke-oven gases, must be freed from acid gases contained therein prior to use because said substances disturb further processing. Typical acid gases, which disturb further processing and must therefore be separated from the gases to be obtained, are hydrogen sulphide ($H_2S$), carbonyl sulphide (COS), organic sulphur compounds, ammonia ($NH_3$) or hydrocyanic acid (HCN). These gases are of a corrosive effect and are toxic. A way to remove these from the gases to be obtained is gas scrubbing using physically absorbing solvents. Suitable solvents absorbing acid gas are, for example, propylene carbonate, N-methylpyrrolidone, alkylated polyethylene glycol ether and methanol. Chemically absorbing solvents can also be used but their absorption capacity for organic sulphur compounds is only low. Examples of chemically absorbing solvents are ethanol amines or alkali salt solutions.

For recovery of the sulphur compounds contained in the acid gases the acid gases from the regeneration unit of the gas scrubbing process are normally fed to a Claus plant in which a part-stream of the separated hydrogen sulphide is burnt to give sulphur dioxide which is then converted with the residual stream of hydrogen sulphide to form sulphur together according to the Claus reaction. The sulphur can be further used in most diverse ways.

The industrial gases to be treated frequently also contain larger portions of carbon dioxide ($CO_2$) in addition to sulphur constituents, such as hydrogen sulphide ($H_2S$), carbon oxide sulphide (COS) and mercaptans. Large portions of carbon dioxide are formed, for example, in synthesis gas processes in which the carbon monoxide formed in synthesis gas production is converted to form carbon dioxide by means of CO conversion such that these industrial gases often contain larger amounts of carbon dioxide. The portion of the carbon dioxide can accordingly be up to 50 percent by volume (vol.-%) in the converted synthesis gas. On the other hand, the portion of sulphur constituents in the converted synthesis gas can be very low depending on the feedstock for synthesis gas production, portions below 0.1 vol.-% being feasible.

There are prior-art processes which facilitate a separation of the carbon dioxide from the sulphur-containing acid gases. DE 10332427 A1 teaches a method for the removal of hydrogen sulphide and other acid gas constituents from pressurised industrial gases using a physical scrubbing agent as well as the recovery of sulphur from hydrogen sulphide in a Claus plant. In the process the industrial gases to be treated are freed from the acid gases contained therein by gas scrubbing using suitable absorbing solvents and the laden absorbing agent is passed to regeneration. The gas scrubbing section is of the multi-stage type, the various regeneration stages having different pressure levels and a lower pressure than the absorption step such that a sulphur constituents-enriched acid gas is obtained. Different fractions of acid gas are obtained which can also differ in the acid gas contents and types.

Downstream of the actual Claus process in many Claus plants a hydrogenation is carried out by means of which the sulphur dioxide present in the process is hydrogenated and converted to form hydrogen sulphide. Normally, this hydrogenation is a necessary process step to prepare the Claus process gas for the so-called Claus process gas treatment.

In gas scrubbing, whether it be physical or chemical, it cannot be avoided that, apart from the sulphur constituents to be removed from the synthesis gas, also a significant portion of the carbon dioxide contained in the gas to be treated is removed from the feed gas by scrubbing such that major part of the acid gases re-liberated in the regeneration unit of the gas scrubbing section often consists of carbon dioxide. The latter has a disturbing effect in the further processing of the acid gas in a Claus plant because the combustible acid gases have only a low calorific value on account of the dilution with the inert carbon dioxide and, as a result of which, it is not or only hardly possible to achieve the high temperature of at least 850-900° C. required for a stable Claus furnace operation.

For this reason, it is often not possible to feed the acid gas fraction of a reduced content of hydrogen sulphide to the Claus burner of the Claus plant without feeding additives.

This is, for example, not desired if the acid gas fractions of a lower content of sulphur than the fraction of the highest content of hydrogen sulphide ($H_2S$) have an extraordinarily high content of carbon dioxide. An addition of this fraction to the Claus reactor or the Claus reaction chamber may have the effect that a further reaction of the sulphur dioxide with the residual hydrogen sulphide is impeded or prevented on account of the reduced content of hydrogen sulphide.

It is therefore the objective of the invention to provide a method which feeds an as low amount of absorbed carbon dioxide as possible to the Claus process as this relieves the entire Claus plant and accordingly results in lower investment costs.

The invention achieves this objective by a method according to which, on the one hand, only the hydrogen sulphide-rich acid gas fraction is fed to a Claus plant and the sulphur compounds still contained in the Claus tail gas leaving the Claus plant are almost completely hydrogenated to hydrogen sulphide ($H_2S$) by a subsequent hydrogenation, thus obtaining a hydrogenated Claus tail gas, and, on the other hand, at least one of the carbon dioxide-rich, hydrogen sulphide-poor acid gas fractions from the regeneration unit, which has a lower content of sulphur than the fraction of the highest content of hydrogen sulphide ($H_2S$), is merged with the hydrogenated Claus process gas to form a joint process gas stream which is passed to further process steps or recycled to the process.

Further processing of the merged fractions can be optional.

The main claim especially relates to a method for the processing of a carbon dioxide-rich acid gas in a Claus process, according to which (a) an industrial gas to be freed from sulphur constituents and containing at least hydrogen sulphide and carbon dioxide as acid gas constituents is first submitted to gas scrubbing using an acid gas-absorbing solvent which absorbs sulphur constituents more selectively than carbon dioxide, and (b) the laden solvent is fed to a regeneration unit for regeneration, and (c) the acid gas liberated in the regeneration and consisting of sulphur constituents and carbon dioxide ($CO_2$) is separated into at least two acid gas fractions, and at least one acid gas fraction of a higher content of sulphur constituents is obtained, and (d) the fraction of the highest content of hydrogen sulphide ($H_2S$) is fed to a Claus plant, in which the major part of the hydrogen sulphide ($H_2S$) contained is converted to sulphur (S), and (e) the sulphur compounds still contained in the Claus process gas leaving the Claus plant are almost completely hydrogenated to hydrogen sulphide ($H_2S$) by a subsequent hydrogenation, thus obtaining a hydrogenated Claus process gas, and (f) at least one carbon dioxide-laden, hydrogen sulphide-poor acid gas fraction from the regeneration unit, which has a lower content of sulphur than the fraction of the highest content of hydrogen sulphide ($H_2S$), is merged with the hydrogenated Claus process gas to form a joint process gas stream which is passed to further process steps or recycled to the process.

In principle, the number of carbon dioxide-laden, hydrogen sulphide-poor fractions from the regeneration unit, which has a lower content of sulphur than the fraction of the highest content of hydrogen sulphide ($H_2S$), can be optional. All carbon dioxide-laden, hydrogen sulphide-poor fractions from the regeneration unit, which has a lower content of sulphur than the fraction of the highest content of hydrogen sulphide ($H_2S$), can, in principle, be fed to the hydrogenated Claus process gas. According to the invention at least one acid gas fraction from the regeneration unit, which has a lower content of sulphur than the fraction of the highest content of hydrogen sulphide ($H_2S$), must be merged with the hydrogenated Claus process gas to form a joint process gas stream which is passed to further process steps or recycled to the process.

In a preferred embodiment the separation into at least two acid gas fractions is performed by first feeding the solvent laden with acid gases from gas scrubbing to at least one flash stage for the depletion of carbon dioxide prior to feeding the solvent to a regeneration column, thereby obtaining a carbon dioxide-rich acid gas fraction and a solvent laden with the residual acid gases, thereby obtaining in the regeneration column another carbon dioxide-depleted and sulphur constituents-enriched acid gas fraction which is fed to the Claus burner for combustion using an oxygen-containing gas.

The depletion in carbon dioxide of the laden solvent is preferably performed in two to four flash stages arranged in flow direction upstream of the regeneration column. The number of flash stages, however, can be optional. The process used for absorption, flashing in the flash stage and regeneration is arbitrary and is known in prior art. The amount of sulphur constituents in the sulphur constituents-enriched part-stream fed to the burner of the Claus reactor is typically 20 to 40 percent of the total sulphur removed from the feed gas.

In an embodiment of the invention the residual gas stream merged from the Claus tail gas and the carbon dioxide-laden, hydrogen sulphide-poor acid gas is recycled to the absorption column installed in the main gas stream by means of a compressor for gas recycling. As a result, the carbon dioxide is recycled to the first absorption column and discharged from the process together with the product gas.

In a further embodiment of the invention the hydrogen sulphide ($H_2S$) still present in the merged process gas stream is fed to at least one further gas scrubbing section equipped with an absorption column such that an almost sulphur-free Claus tail gas is obtained.

In at least one acid gas scrubbing section, the solvent used for the absorption is preferably a physically acting solvent of a high selectivity for sulphur constituents, in particular hydrogen sulphide ($H_2S$), as compared to carbon dioxide ($CO_2$). Examples of suitable physical solvents are Morphysorb® (mixture of N-formyl morpholine and N-acetyl morpholine), Selexol® (mixture of dimethyl ethers of polyethylene glycols), N-methylpyrrolidone (NMP), methanol or propylene carbonate. This can be used in at least one of the absorption columns for gas scrubbing or the absorption columns downstream of the hydrogenation stage but also in several or in all absorption columns.

Furthermore, in at least one acid gas scrubbing section, a selectively acting chemical solvent which is suitable for a selective removal of sulphur constituents as compared to carbon dioxide ($CO_2$) can also be used in aqueous solution. Examples of chemical solvents are methyl diethanol amine (MDEA), Flexsorb® (mixture of sterically hindered amines) or alkali salt solutions (e.g. potash solutions). This can also be used in at least one of the absorption columns for gas scrubbing or the absorption columns downstream of the hydrogenation stage but also in several or in all absorption columns.

The carbon dioxide content of the industrial gas to be treated can be of any level desired. The carbon dioxide content in the feed gas can thus, for example, be 30 to 50 percent by volume. The application of the inventive method will be of particular advantage if the content of sulphur constituents is little compared to the carbon dioxide content. Thus it is possible to treat those gases the sulphur constituents content of which ranges between 0.1 and 1 percent by volume hydrogen sulphide (or mole equivalent). The industrial gas to be treated can also contain ammonia. The industrial gas to be treated for desulphurisation can, for example, be synthesis gas from CO conversion. The industrial gas to be treated for desulphurisation can, for example, also be natural gas.

The number of acid gas fractions into which the acid gas liberated in the regeneration and consisting of sulphur constituents and carbon dioxide ($CO_2$) is separated can be optional. According to the invention the fraction of the highest content of hydrogen sulphide ($H_2S$) is fed to the Claus burner of a Claus plant such that the number of fractions having a lower content of sulphur than the fraction of the highest content of hydrogen sulphide ($H_2S$) can also be optional.

In principle, all these can be merged with the hydrogenated Claus tail gas and passed to further use outside the Claus plant. The number of fractions selected and passed to further use outside the Claus plant can also be optional.

Such use can, for example, be a disposal. However, it can also be a further process step which uses the gases contained in the depleted fractions. The further use, however, can, in principle, be optional. In another embodiment of the invention there is another gas scrubbing section downstream of the hydrogenation stage and the merged stream of the hydrogenated Claus tail gas with the hydrogen sulphide-poor, carbon dioxide-rich fraction such that a desulphurised Claus process gas or Claus tail gas is obtained which is, for example, fed to a post-combustion unit. The latter includes a burner which uses an oxygen-containing gas or air to burn the residual sulphur compounds to sulphur dioxide ($SO_2$) which is discharged into the atmosphere. In this, it is also possible to use an additional combustion gas.

Processing of the merged fractions by means of a Claus plant and a hydrogenation stage downstream of the Claus plant is, for example, applied in the further process flow.

The invention has the advantage that acid gas fractions of a reduced content of hydrogen sulphide do not have to be fed to the Claus burner of a Claus plant or a reaction chamber of a Claus plant but can be merged with the tail gas of a Claus plant and passed to further use. This accordingly helps to improve the cost effectiveness of the entire process.

The inventive contrivance is illustrated in more detail by means of three drawings, the said drawings only being examples for the design of the inventive contrivance.

Figure 1:
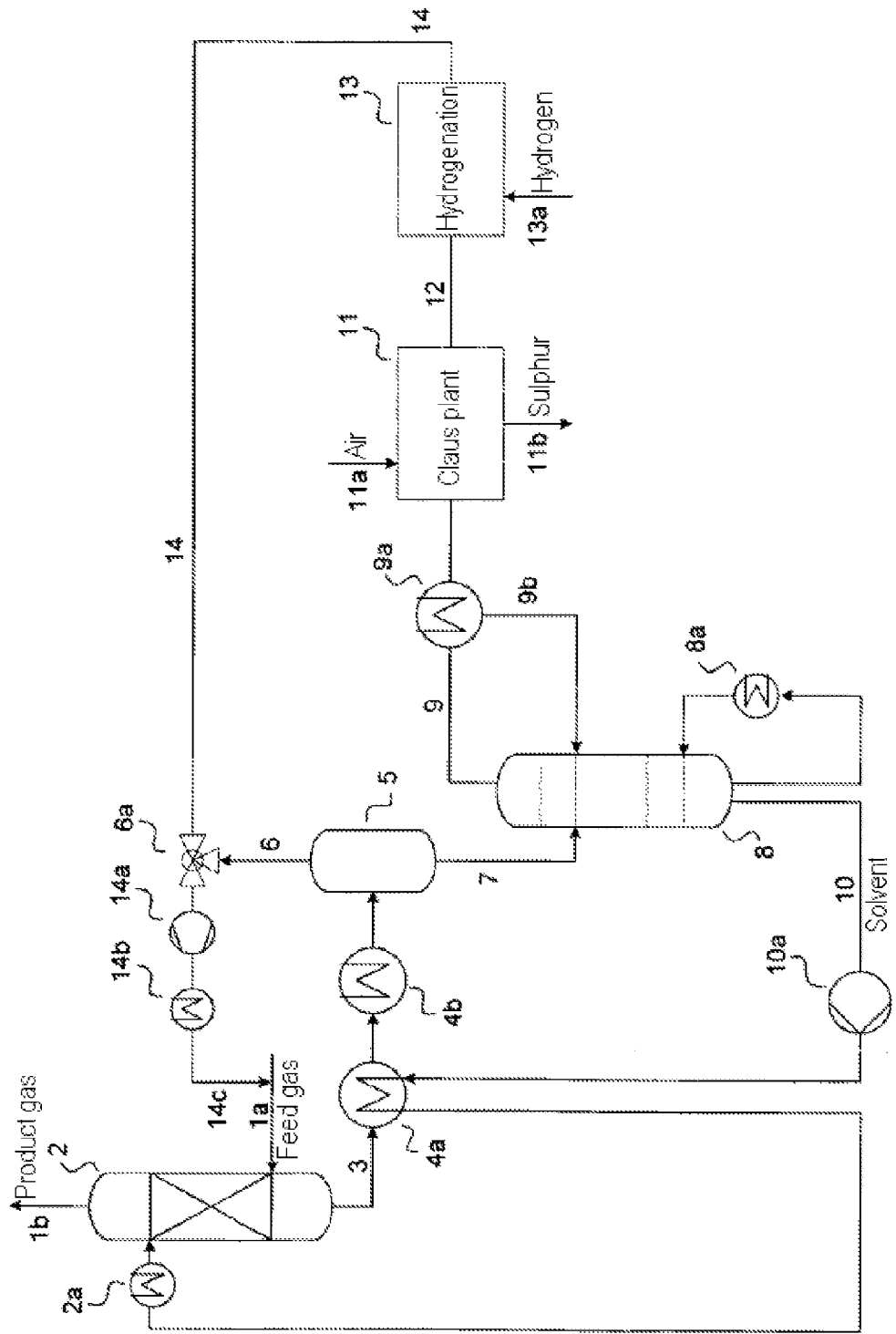
FIG. 1 shows an inventive embodiment in which the hydrogenated Claus tail gas from a Claus process is merged with the carbon dioxide-rich acid gas fraction from a gas scrubbing section and the merged gas stream is recycled to the gas scrubbing process.

FIG. 1 shows an inventive process flow in which a feed gas to be treated (1*a*) is fed to a gas scrubbing section (2). For gas scrubbing a sulphur-containing feed gas (1*a*) is fed to an absorption column (2) where the feed gas is brought into contact with an absorbing solvent cooled down by means of a heat exchanger (2*a*). This gives a treated product gas (1*b*) which is free or almost free of sulphur compounds, the major part of the carbon dioxide contained in the feed gas (1*a*) also remaining in the product gas (1*b*), and the solvent laden with acid gases (3). According to the invention the laden solvent is preheated by means of heat exchangers (4*a*,4*b*) and passed to a flash vessel (5). Flashing in the flash vessel (5) gives a carbon dioxide-laden, hydrogen sulphide-poor acid gas fraction (6) and a carbon dioxide-depleted, sulphur constituents-enriched laden solvent (7). This is passed to a regeneration column (8) which is here, in an exemplary mode, heated by means of a reboiler (8*a*), the solvent being freed from the sulphur constituents-enriched acid gas by heating and flashing. This gives a carbon dioxide-depleted, sulphur constituents-enriched acid gas (9) and a regenerated solvent (10). The acid gas (9) is fed to the Claus plant (11) via a condenser (9*a*). Condensed vapours (9*b*) are recycled to the regeneration column (8). The carbon dioxide-laden, hydrogen sulphide-poor acid gas fraction (6) from the flash vessel (5) has a lower sulphur constituents concentration ($X_1$ ($H_2S$)) than the acid gas fraction richer in sulphur constituents (9) from the regeneration column (8) ($X_2$, ($H_2S$)). In the Claus plant (11) the carbon dioxide-depleted, hydrogen sulphide-enriched acid gas (9) is converted to sulphur dioxide ($SO_2$) by partial combustion with an oxygen-containing gas (11*a*) and then to sulphur (11*b*, S) by subsequent post-reaction of the sulphur dioxide with the residual hydrogen sulphide ($H_2S$), the sulphur obtained being discharged and passed to further use. The Claus process gas (12) from the Claus process (11) contains residual sulphur mainly in the form sulphur dioxide ($SO_2$). This Claus process gas (12) is fed to a hydrogenation stage (13) where the residual sulphur compounds in the Claus process gas (12) are hydrogenated to hydrogen sulphide ($H_2S$) using hydrogen (13*a*, $H_2$). The hydrogenated Claus process gas (14) is merged with the carbon dioxide-laden, hydrogen sulphide-poor acid gas (6) via a valve (6*a*) and recycled to the feed gas (1*a*) via a compressor for gas recycling (14*a*) and a heat exchanger (14*b*) and thus to the process (14*c*). The carbon dioxide ($CO_2$) is discharged from the process together with the product gas (1*b*).

Figure 2:
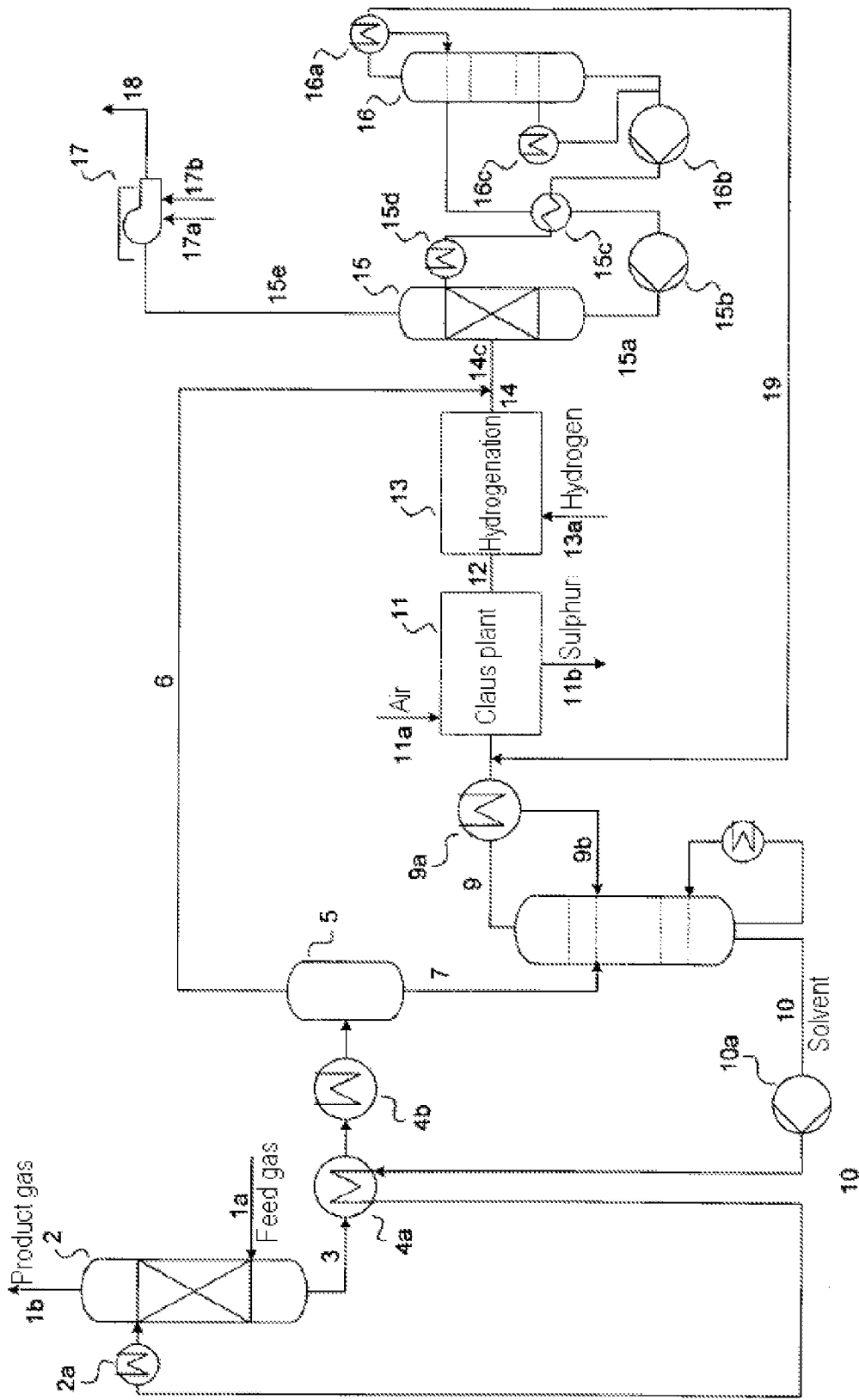
FIG. 2 shows an inventive embodiment in which the hydrogenated Claus tail gas is merged with the carbon dioxide-rich acid gas fraction from a gas scrubbing section and the merged gas stream is fed to another gas scrubbing process including post-combustion.

FIG. 2 shows an inventive embodiment in which the hydrogenated Claus tail gas (14) is merged with the carbon dioxide-rich acid gas fraction (12) from a gas scrubbing section (2) and the merged gas stream is fed to another gas scrubbing process (15) including post-combustion (16). As in FIG. 1 the feed gas to be treated (1*a*) is first freed from sulphur compounds in a gas scrubbing section (2) including subsequent regeneration (6,9), thereby obtaining a carbon dioxide-laden, hydrogen sulphide-poor acid gas (6) and a carbon dioxide-depleted, hydrogen sulphide-enriched acid gas (9). The carbon dioxide-depleted, hydrogen sulphide-enriched acid gas (9) is fed to a Claus process (11) in which the carbon dioxide-depleted, hydrogen sulphide-enriched acid gas (9) is converted to sulphur dioxide ($SO_2$) by partial combustion and the sulphur dioxide by subsequent post-reaction with the residual hydrogen sulphide ($H_2S$) to sulphur which is discharged and passed to further use. The Claus process gas (12) from the Claus process (11) contains residual sulphur mainly in the form sulphur dioxide ($SO_2$). This Claus process gas (12) is fed to a hydrogenation stage (13) where the residual sulphur compounds in the Claus process gas (12) are hydrogenated to hydrogen sulphide ($H_2S$) using hydrogen (13*a*). In this, a hydrogenated Claus process gas (14) is obtained which according to the invention is merged with the carbon dioxide-laden, hydrogen sulphide-poor acid gas (6) and passed through a gas scrubbing section (15) with subsequent regeneration unit (16). The sulphur compounds-depleted acid gas (15*e*) from additional gas scrubbing section (15) is fed to a post-combustion unit (17) where the residual sulphur compounds are burnt using an oxygen-containing gas (17*a*) and a combustion gas (17*b*), if required, and the exhaust gas (18) is discharged into the atmosphere. The hydrogen sulphide-rich Claus tail gas (19) from the regeneration unit (16) is recycled to the carbon dioxide-depleted, hydrogen sulphide-enriched acid gas (9) upstream of the Claus process (11).

LIST OF REFERENCE NUMBERS AND DESIGNATIONS

1*a* Sulphur-containing industrial gas to be treated, feed gas
1*b* Treated product gas
2 Absorption column
2*a* Heat exchanger
3 Laden solvent
4*a*, 4*b* Heat exchanger
5 Flash vessel
6 Carbon dioxide-laden, hydrogen sulphide-poor acid gas
6*a* Valve
7 Carbon dioxide-depleted, sulphur constituents-enriched laden solvent
8 Regeneration column
8*a* Reboiler
9 Carbon dioxide-depleted, hydrogen sulphide-enriched acid gas
9*a* Condenser
9*b* Condensed vapours form the condensor
10 Regenerated solvent
10*a* Pump
11 Claus process with burner and Claus reaction chamber
11*a* Oxygen-containing gas, air 11b Sulphur
12 Claus process gas
13 Hydrogenation stage
13a Hydrogen
14
14a Compressor for gas recycling
14b Heat exchanger
14c Recycled process gas
15 Absorption column of additional gas scrubbing section
15a Laden solvent
15b Pump
15c Heat exchanger
15d Heat exchanger
15e Sulphur compounds-depleted acid gas
16 Regeneration unit
16a Heat exchanger
16b Pump
16c Reboiler
17 Post-combustion unit
17a Oxygen-containing gas, air
17b Combustion gas
18 Exhaust gas
19 Recycled, hydrogen sulphide-rich Claus tail gas
$X_1(H_2S)$ Concentration of $H_2S$ in the carbon dioxide-rich acid gas
$X_2(H_2S)$ Concentration of $H_2S$ in the $H_2S$-enriched acid gas fraction

The invention claimed is:

1. A method for the processing of a carbon dioxide-rich industrial gas to be freed from sulphur constituents, according to which
   (a) an industrial gas to be freed from sulphur constituents and containing at least hydrogen sulphide and carbon dioxide as acid gas constituents is first submitted to gas scrubbing using an acid gas-absorbing solvent which absorbs sulphur constituents more selectively than carbon dioxide, and
   (b) the laden solvent is fed to a regeneration unit for regeneration, and
   (c) the acid gas liberated in the regeneration and consisting of sulphur constituents and carbon dioxide ($CO_2$) is separated into at least two acid gas fractions, and at least one acid gas fraction of a higher portion of sulphur constituents is obtained, and
   (d) the fraction of the highest content of hydrogen sulphide ($H_2S$) is fed to a Claus plant in which the major part of the hydrogen sulphide ($H_2S$) contained is converted to sulphur, and
   (e) the sulphur compounds still contained in the Claus process gas leaving the Claus plant are almost completely hydrogenated to hydrogen sulphide ($H_2S$) by a subsequent hydrogenation, thus obtaining a hydrogenated Claus process gas, and
   (f) at least one carbon dioxide-laden, hydrogen sulphide-poor acid gas fraction from the regeneration unit, which has a lower content of sulphur than the fraction of the highest content of hydrogen sulphide ($H_2S$), is merged with the hydrogenated Claus process gas to form a joint process gas stream which is passed to further process steps or recycled to the process.

2. The method for the processing of a carbon dioxide-rich industrial gas to be freed from sulphur constituents according to claim 1, wherein all carbon dioxide-laden, hydrogen sulphide-poor fractions from the regeneration unit, that have a lower content of sulphur than the fraction of the highest content of hydrogen sulphide ($H_2S$), are fed to the hydrogenated Claus process gas.

3. The method for the processing of a carbon dioxide-rich industrial gas to be freed from sulphur constituents according to claim 1, wherein the residual gas stream merged from the Claus tail gas and the carbon dioxide-laden, hydrogen sulphide-poor acid gas is recycled to the absorption column installed in the main gas stream by means of a compressor for gas recycling.

4. The method for the processing of a carbon dioxide-rich industrial gas to be freed from sulphur constituents according to claim 1, wherein the hydrogen sulphide ($H_2S$) still present in the merged process gas stream is fed to at least one further gas scrubbing section equipped with an absorption column such that an almost sulphur-free Claus tail gas is obtained.

5. The method for the processing of a carbon dioxide-rich industrial gas to be freed from sulphur constituents according to claim 1 wherein a selectively acting chemical scrubbing agent is used in at least one acid gas scrubbing section.

6. The method for the processing of a carbon dioxide-rich industrial gas to be freed from sulphur constituents according to claim 1 wherein a selectively acting physical scrubbing agent is used in at least one acid gas scrubbing section.

7. The method for the processing of a carbon dioxide-rich industrial gas to be freed from sulphur constituents according to claim 1 wherein the industrial gas to be treated for desulphurisation is synthesis gas from CO conversion.

8. The method for the processing of a carbon dioxide-rich industrial gas to be freed from sulphur constituents according to claim 1 wherein the industrial gas to be treated for desulphurisation is natural gas.

* * * * *